United States Patent
Pero, III

(10) Patent No.: US 11,028,510 B2
(45) Date of Patent: Jun. 8, 2021

(54) SYSTEM FOR MANUFACTURE OF BULLETPROOF COMPONENTS, SHEETS, AND GARMENTS WITH HIGH MODULUS STRONG FIBERS HELD IN A POLYAMIDE MATRIX

(71) Applicant: Michael A. Pero, III, Richardson, TX (US)

(72) Inventor: Michael A. Pero, III, Richardson, TX (US)

( * ) Notice: Subject to any disclaimer, the term of this patent is extended or adjusted under 35 U.S.C. 154(b) by 0 days.

(21) Appl. No.: 16/690,346

(22) Filed: Nov. 21, 2019

(65) Prior Publication Data

US 2020/0255993 A1    Aug. 13, 2020

Related U.S. Application Data

(63) Continuation-in-part of application No. 16/235,998, filed on Dec. 28, 2018, now Pat. No. 10,894,343.

(51) Int. Cl.
| | |
|---|---|
| *D04H 1/559* | (2012.01) |
| *B32B 5/02* | (2006.01) |
| *B32B 5/26* | (2006.01) |
| *F41H 5/04* | (2006.01) |

(52) U.S. Cl.
CPC ............ *D04H 1/559* (2013.01); *B32B 5/022* (2013.01); *B32B 5/26* (2013.01); *F41H 5/0485* (2013.01); *B32B 2262/0261* (2013.01); *B32B 2264/0264* (2013.01); *B32B 2571/02* (2013.01); *D10B 2331/02* (2013.01); *D10B 2501/04* (2013.01); *D10B 2507/00* (2013.01)

(58) Field of Classification Search
CPC .......... D04H 1/559; B32B 5/022; B32B 5/26; B32B 2262/0261; B32B 2264/0264; F41H 5/0485; D10B 2331/02; D10B 2501/04; D10B 2507/00
See application file for complete search history.

(56) References Cited

U.S. PATENT DOCUMENTS

| | | |
|---|---|---|
| 3,052,646 A | 9/1962 | Doggett et al. |
| 3,382,185 A | 5/1968 | Wheeler et al. |
| 3,427,179 A | 2/1969 | Davis et al. |
| 3,489,631 A | 1/1970 | Chen et al. |
| 4,650,170 A | 3/1987 | Harpell |
| 5,430,068 A | 7/1995 | Subramanian |

(Continued)

OTHER PUBLICATIONS

Article—Polymer, vol. 19, No. 1, p. 77 to 80—1978 by Kapko, et al.

*Primary Examiner* — Vishal I Patel
(74) *Attorney, Agent, or Firm* — Ernest D. Buff & Associates, LLC; Ernest D. Buff; Dave Narasimhan

(57) ABSTRACT

A bulletproof garment fabric comprises parallel high strength fibers that are placed in layers. The layers are arranged in multiple orientations to resist bullet penetration stress and bonded to each other by precipitated ultrafine particles of nylon. The bonded high strength fibers resist the penetration load of a bullet and are thereby operative to prevent penetration of the bullet through the garment fabric. A porous nylon sheet is injection molded, and combined with strong fibrous materials having high modulus to form a layered sandwich that imparts strength and anti-ballistic properties to jackets, components and armor for vehicles and aircraft used in military applications.

4 Claims, 1 Drawing Sheet

(56) References Cited

U.S. PATENT DOCUMENTS 8,044,139 B2 10/2011 Youn et al.
2010/0325851 A1* 12/2010 Han .................... D03D 1/0052
28/165

* cited by examiner

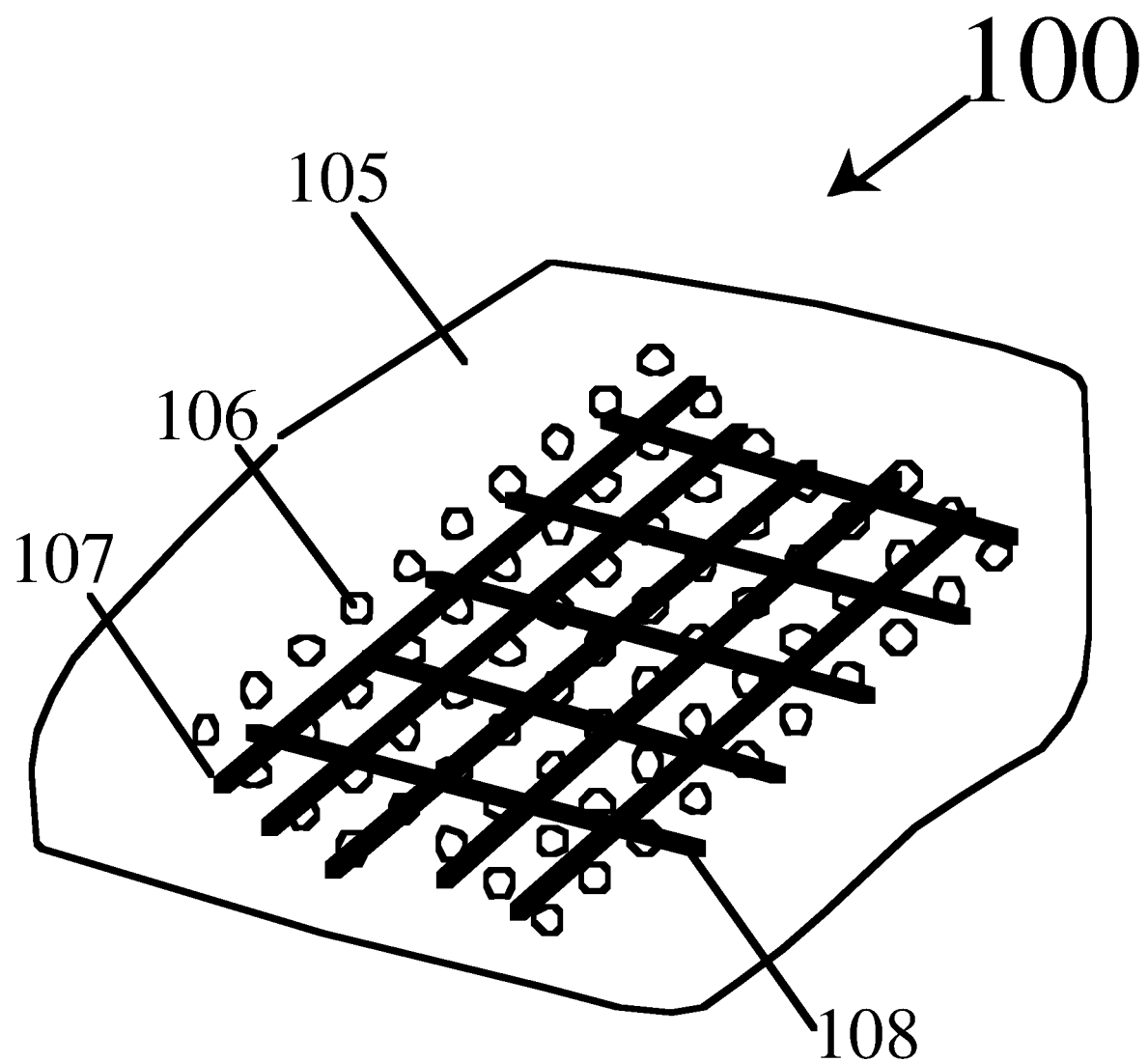

SYSTEM FOR MANUFACTURE OF BULLETPROOF COMPONENTS, SHEETS, AND GARMENTS WITH HIGH MODULUS STRONG FIBERS HELD IN A POLYAMIDE MATRIX

This is a continuation-in-part of U.S. application Ser. No. 16/235,998 filed Dec. 28, 2018 for "SYSTEM FOR MANUFACTURE OF LOW-DENSITY SHEETS RIGIDIZED WITH NYLON FIBERS", the subject matter of which is hereby specifically incorporated by reference thereto.

1. FIELD OF THE INVENTION

The present invention relates to manufacture of bulletproof components, jackets or garments manufactured using injection molding techniques or from injection molded sheets, and reinforced with bundles of high modulus high strength fibers held in place by a polyamide matrix. The fibers reinforce the components, jackets, or garments in multiple directions distributing the bullet penetration load and preventing the entry of the bullet though the bulletproof garment, and are especially well suited for use in ground or air vehicles, body armor and other military applications where anti-ballistic characteristics and properties are required.

2. DESCRIPTION OF THE PRIOR ART

Numerous prior art patents and disclosures relate to the formation of bulletproof garments with Kevlar and or other fibrous material, which oftentimes restrict the movement of the wearer.

U.S. Pat. No. 3,052,646 to Doggett et al. discloses blending high strength fibers incorporated within a garment. Garments of this type are readily available to law enforcement officials. They are bulky and heavy and are characterized by the presence of finely divided polyamide and polyethylene glycol. These granulated synthetic linear polyamides are molded with or without filler, and with the aid of mold lubricant. The process disclosed by Doggett et al. does not produce a bulletproof garment.

U.S. Pat. No. 3,382,185 to Wheeler et al. discloses a nylon solvent and method of making the same. This solvent is prepared by reacting a dimethylmetadioane with formaldehyde. The nylon solvent is not indicated to bond high strength fibers to the polyamide matrix to thereby form a bonded bulletproof garment.

U.S. Pat. No. 3,427,179 to Davis et al. discloses a method of making porous polyimide fabric. Micro-porous polyimide products, for example, leather or like fabric substitute is disclosed, together with a method for manufacturing the same. The product is formed by dissolving polyimide in liquid which is not solvent at room temperature and solvent at elevated temperature, applying the solution to a base, cooling the solution of polyimide liquid solvent to a temperature below which the liquid is a solvent for polyimide thereby forming a stable gel and liquid extraction at a temperature at which the liquid is a non-solvent. The solvent is glycol, and the extraction is carried out using water. The gel is melted at a high temperature, and the melt is distributed over the fiber form, which solidifies to form a bond. The object formed is a fabric, with no high strength fibers and the fabric is not indicated to be a bulletproof garment.

U.S. Pat. No. 3,489,631 to Chen et al. discloses a method for bonding polyurethane to plastic material. A method of bonding polyurethane to plastics, for example, polyamides, and a hose comprised of polyamide inner tubing, a braided jacket, and a polyurethane outer sheath are disclosed. The method involves the steps of (i) applying a solvent for the polyamide, (ii) applying a solvent for the polyurethane and (iii) extruding the polyurethane jacket on a sheath. The solvent for the polyamide is resorcinol, and the solvent for the polyurethane is vinyl pyrrolidone. The product produced is not a bulletproof garment.

U.S. Pat. No. 4,650,710 to Harpell et al. discloses a ballistic resistant fiber article. This is one of several patents from Allied Corporation which uses gel spun fibers under the trade name Spectra. The improved fabric which comprises at least one network of fibers selected from the group consisting of extended chain polyethylene (ECPE) extended chain polypropylene (ECPP) fibers, extended chain polyvinyl alcohol fibers and extended chain polyacrylonitrile fibers. A low modulus elastomeric material, which has a tensile modulus of less than about 6,000 psi, measured at about 23° C., substantially coats the fibers of the network. Preferably, the fibers have a tensile modulus of at least about 500 grams/denier and an energy-to-break of at least about 22 Joules/gram. The fiber bundles are embedded in a low modulus matrix formed by coating fibers. A plurality of layers in which each layer is comprised of coated fibers arranged in a sheet-like array and successive layers of such fabrics are rotated with respect to the previous layer. An example of such multilayer fabric structures is a fine layered structure in which the second, third, fourth and fifth layers are rotated +45°, −45°, 90° and 0° with respect to the first layer, but not necessarily in that order. Other examples include multilayer fabrics with alternating fabric layers rotated 90° with respect to each other. The fibers are not held n a polyamide or nylon matrix.

U.S. Pat. No. 5,430,068 to Subramanian discloses recovery of polyamide using a solution process. The polyamide dissolving solution is a solvent selected from the group consisting of a substantially anhydrous ethylene glycol, propylene glycol, and aliphatic carboxylic acid having from 2 to 6 carbon atoms. The solvent is heated to 180° C., and the dissolved solution is cooled to 100° C. to precipitate dissolved nylon. This solvent is not used to bond nylon fibers. This precipitated nylon is not used to create a bulletproof garment.

U.S. Pat. No. 8,044,139 to Youn et al. discloses a fiber-reinforced nylon composition. This fiber-reinforced nylon composition includes 25 to 75 parts by weight of a polyacrylamide resin, 25 to 75 parts by weight of reinforcing fibers. The fibers have a cross-sectional aspect ratio of 1.5 or more, An impact modifier is included in the composition of 1 to 10 parts by weight based on 100 parts by weight of a mixture of the polyacrylamide resin and the reinforced fiber. The fiber-reinforced nylon resin composition exhibits minimal or no warpage with excellent fluidity and impact resistance and high whiteness and a glossy-appearance after dipping in boiling water. The nylon or polyamide composition used is a modified polyamide resin made by Dupont. The fibers used may include a glass fiber, a carbon fiber, an aramide fiber, a potassium titanate fiber, a silicon carbonate fiber. The composition is injection molded at 250° C. The product thus formed is not a bulletproof garment.

The article in Polymer, volume 19, number 1 pages 77 to 80 1978 by Kapko et al., details degradation of nylon-6 by ethylene glycol. Glycolysis of nylon-6 in boiling ethylene glycol was studied. Oligoamides with amino- and hydroxyl end-groups were obtained. The following catalysts were examined: zinc acetate, sodium glycolate and poly(phosphoric acid). The reaction rate constants found for first-order reaction proved that the amino-groups formed during the degradation take part in acceleration or slowing of the reaction velocity. The reaction rate constants did not change in the polymerization degree range of P=159-20. Beginning from the polymerization degree P=20 in case of zinc acetate, sodium glycolate and without the catalyst the reaction rate constants increased, the reverse effect was observed when poly(phosphoric acid) was used.

Based on the foregoing, there exists a need in the art for an easy to use method for manufacturing bulletproof components, jackets, and garments composed of structural fiber reinforced nylon sheets that exhibit bulletproof properties.

SUMMARY OF THE INVENTION

The present invention provides a bulletproof garment made from one or layers of bundles of parallel orientation high strength high modulus fibers placed on a porous mesh, each layer oriented with respect to the previous layer providing strength to the fiber assembly. A bonding solution of polyamide is prepared by dissolving harvested clean nylon carpet fibers or melt-spun virgin nylon fibers in a glycol solution at 180° C. At this temperature, the nylon fibers dissolve in glycol, forming a gel. Next the glycol solution is cooled to 160° C., a temperature at which nylon is no longer soluble in glycol, resulting in the precipitation of ultrafine particles of nylon. The glycol solution with precipitates of nylon particles is filtered to remove most of the glycol to dissolve more of the nylon fibers. The remaining glycol with nylon precipitate is filtered through the fiber assembly resulting in rapid accumulation of ultrafine nylon particles on the surface of the high strength fibers. The glycol drains through the mesh leaving behind high strength fibers intimately coated with nylon ultra-fine nylon particles. The high strength fibers with nylon particles are heated to 180° C. to bond the high strength fibers together with the ultra-fine nylon precipitates to form a bulletproof fabric, which is cut, and shaped to form a bulletproof garment.

In an alternate embodiment, a nylon sheet, which may have fine holes therein is used to support the parallel high strength fiber assembly of varying orientation. This alternate embodiment for a ballistic nylon sheet comprises applied applications for injection molded ballistic components, jackets and sheets as well as other applications where injection molding is used as a manufacturing technique to produce specific sizes and shapes for specific military applications that require anti-ballistic properties. The injection molded component, jacket or sheet produced is further processed and coated to achieve desired anti-ballistic strength and properties.

Inasmuch as the components, jackets and sheets can be injection molded, they can be readily manufactured in a myriad of sizes and shapes. Sizing and shaping of the components, jackets and shapes readily controlled by varying the size and shape of the injection mold.

Potential military applications comprise ground vehicle parts which require anti-ballistic capabilities; jet fighter anti-ballistic under skin armor. This armor forms a second under skin enabling a military aircraft to be bullet resistant and thereby increases the aircraft's resiliency for air worthiness and survivability from attacks. The ballistic armor is additionally well suited for use in military equipment such as helmets, body armor and the like.

In addition, the bulletproof materials can be used in combination with other high modulus, strong materials in a "sandwich" application. During manufacture, an injection molded, porous nylon sheet is combined with other fibrous materials having high strength to form a layered sandwich that imparts strength and anti-ballistic properties for desired military applications.

For example parts for military ground vehicles can be made to specific dimensions via injection molding and then combined to make a "sandwich" with other materials for maximum strength and blast survivability where ballistic strength materials are needed to increase a vehicle's armament while reducing the vehicles weight.

In a further embodiment, a nylon sheet having fine holes therein is used to support the parallel high strength fiber assembly of varying orientation. Glycol, processed to form fine precipitates therein is then passed through the fiber assembly causing substantially all the fibers and the underlying nylon sheet to be coated with ultrafine particles of nylon. The coated nylon sheet is then heated to 180° C. to bond together the nylon sheet and the fibers.

This fiber bonded nylon sheet has a density ranging from 0.8 to 2.0 grams/cc, depending upon the density and amount of high strength fibers used. Nylon 6 has a typical density of 1.14 grams/cc and nylon 66 has a density of 1.1314 grams/cc for nylon 66. Nylon 6 melts at a temperature of 215° C. while nylon 66 melts at a temperature of 264° C.

Another adhesive may bond kinked fragments of nylon fibers. The assembled nylon fibers are first immersed in an aqueous solution of resorcinol. Resorcinol is a solvent for nylon and attaches itself to the nylon fiber surface. Next, the air-laid nylon fibers with resorcinol coating are immersed in a solution of vinylpyrrolidone solvent. Next, this double-coated nylon fiber assembly is sprayed with polyurethane which swells over the vinylpyrrolidone. The whole structure is then heated to 180° C., whereby the nylon fibers become permanently bonded to the polyurethane, creating a rigid sheet.

The bonded nylon bulletproof sheet formed in accordance with the subject invention has a very large number of closed microcells ranging in dimension from 10 to 70 micrometers. These sheets also have extremely small-sized uniformly distributed closed cells of air pockets that enhance the thermal insulation properties as well as provide sound attenuation characteristics. This density of the sheets produced depends on the composition of the high strength fiber layup, mold fill quantity, and the pressure and temperature applied during the sheet formation. The material of the subject invention not only exhibits bullet protection, optimal thermal, acoustic and fire retardation properties, but further does not absorb large amounts of water and does not cause or promote corrosion. The material is not electrically conductive.

In a preferred embodiment, the rigid high strength fiber reinforced nylon sheet for bulletproof garments of the present invention comprises:

1) multiple layers of parallel high strength high modulus fibers assembled on a mesh preform or a nylon sheet with a plurality of apertures for draining glycol, each layer oriented at an angle with respect to an underlying layer, forming a fiber sheet capable of providing strength in multiple orientations that prevent entry of a bullet therethrough;

2) procuring clean nylon fibers from used carpets or virgin nylon of freshly spun fibers;

3) preparing an adhesive of heated glycol to a temperature of 180° C., a temperature at which glycol dissolves procured nylon fibers, forming a gel;

4) cooling glycol with added nylon fibers to 150° C., a temperature at which nylon no longer dissolves in glycol, thereby precipitating ultrafine particles of nylon;

5) pouring the glycol with precipitated nylon particles through the fiber sheet so that the nylon precipitates surround each of the fiber surfaces and the fiber sheet;

6) heating the fiber sheet at a temperature of 180° C. to bond each of the fibers, any residual glycol contained in the fiber sheet facilitating the bond by depressing the melting point of nylon;

7) washing the fiber sheet with high strength fibers in warm water to remove glycol;

whereby the fiber sheet with multi-directional high strength fiber reinforcement intimately bonded together forms a fabric that resists bullet penetration forces to prevent entry of a bullet through the fabric and any garment made therewith.

BRIEF DESCRIPTION OF THE DRAWING

The invention will be more fully understood and further advantages will become apparent when reference is had to the following detailed description of the preferred embodiments of the invention and the accompanying drawing, in which:

FIG. 1 illustrates the process steps employed in the manufacture of the bulletproof nylon sheet.

DETAILED DESCRIPTION OF THE INVENTION

The present invention provides a bulletproof nylon fabric sheet with multi-directionally bonded high strength fibers. The sheet exhibits lightweight and flexibility and is especially well suited for garments used by security and military personnel.

In addition, the sheets can be manufactured using injection molding techniques to produce specific sizes and shapes for specific applications where anti-ballistic properties are required. There is virtually no limit to available sizing and shaping of the sheets, since the sole sizing limitation is the size and shape of the injection mold. Potential applications for injection molding are, but not limited to, military ground vehicle parts which require anti-ballistic capabilities; jet fighter anti-ballistic under skin armor. A second under skin provided by the injection molded sheets enables a military aircraft to resist bullet penetration. This, in turn, thereby increases the planes resiliency for air worthiness and survivability from attacks. The lightweight ballistic under skin is especially well suited for use by jet fighters. Additional types of military equipment for which the anti-ballistic materials are suited include helmets, body armor and the like.

Furthermore, the reinforced nylon sheets can be sandwiched with other high strength materials by combining the sheets with high modulus, strong fibrous materials to form a layered sandwich to that imparts additional strength and anti-ballistic properties for military applications.

These reinforced nylon sheets have a density ranging from 0.12 to 0.66 grams/cc. Solid nylon has a typical density of 1.14 grams/cc and nylon 6 has a density of 1.1314 grams/cc. Nylon 6 melts at a temperature of 215° C. while nylon 66 melts at a temperature of 264° C.

This invention provides a reliable process for producing bulletproof nylon sheets that incorporate high strength fibers in a multiple layer bundle in which fiber layers are oriented at an angle to each other and intimately bonded to each other as well as to the nylon sheet when processed with nylon fill. The nylon fill is produced by filtering glycol though the fiber assembly with precipitated ultrafine particles of nylon. The precipitated nylon particles adhere to external surfaces of the high strength fibers and, when heated, bond together and to the nylon sheet, thereby creating a fabric characterized by the presence of a bullet resistance force load that prevents penetration of a bullet therethrough. Garments, jackets and sandwiched sheets made with the fabric thus provided provide bulletproof functionality.

The adhesive chosen is glycol with precipitated ultrafine particles of nylon. Glycol is inert and does not attack or dissolve nylon fibers at low temperature. However, at a high temperature of 180° C., the nylon is dissolved from nylon fibers. The amount of dissolution is a function of how long glycol contacts the nylon fibers. If this contact time is reduced to below 15 minutes, only a small amount of nylon is dissolved. The nylon, when dissolved by glycol, forms a gel that has dissolved nylon and other dissolved decomposition products. The glycol, with precipitated nylon ultrafine particles, is passed through the high strength fiber assembly to filter out precipitated nylon particles which surround the eternal surface of the fiber and reside within the space between the high strength fiber and the nylon sheet on which the high strength fibers are placed. Next, the high strength fiber bonded nylon sheet is cooled and washed with water at about 50° C. to 80° C. to dissolve unreacted glycol. The sheet is now cut and stitched to create a bulletproof garment, or further shaped into components and jackets for military applications.

FIG. 1 illustrates generally at 100 the configuration of the bulletproof fabric which is used to fabricate the bulletproof garments, jackets and sheets. Nylon sheet 105 has a plurality of apertures 106 therein for drainage of glycol that carries precipitated ultrafine nylon precipitates. Nylon sheet 106 carries several layers of parallel high strength fibers, each layer being inclined to the adjacent layer as shown at 107 and 108. Both the fibers and the nylon sheet are covered with nylon adhesive (not shown).

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A method for manufacturing a nylon bulletproof fabric for stitching a bulletproof garment, comprising the steps of:
   a) preparing an adhesive by heating glycol to a temperature of 180° C. and adding thereto melt-spun nylon fibers or washed nylon fibers harvested from recycled nylon carpet materials, the nylon fibers being chopped to lengths of 1 to 5 inches;
   b) adding chopped nylon fibers to said heated glycol and dissolving all the nylon fibers to form a gel;
   c) cooling the glycol with dissolved nylon fibers to 150° C. to precipitate ultrafine nylon particles;
   d) placing a plurality of parallel high strength fibers in layers, each layer being inclined at an angle with respect to a previous layer so that the fibers carry a bullet penetration load in several directions to prevent the entry of a bullet through the fabric;
   e) passing cooled glycol at 150° C. with precipitated nylon particles through the fiber assembly so that the external surface of the fibers is coated with ultrafine nylon precipitated particles;
   f) heating said adhesive coated assembled fiber assembly to a temperature at 180° C. for sufficient time to bond the nylon fibers;

whereby the bonded fibers form a bulletproof nylon sheet that resists bullet penetration forces in all directions and prevents entry of said bullet through the fabric.

2. The method for manufacturing a nylon bulletproof fabric as recited by claim 1, wherein said high strength fiber is polyamide fiber, polyethylene and polyolefin fibers or glass fibers.

3. The method for manufacturing a nylon bulletproof fabric as recited by claim 1, wherein said adhesive is a gel formed by dissolving nylon in glycol at 180° C.

4. The method for manufacturing a nylon bulletproof fabric as recited by claim 1, wherein said bulletproof nylon sheet is shaped to form a jacket that resists bullet penetration forces.

\* \* \* \* \*